United States Patent [19]
Maccan

[11] Patent Number: 5,760,956
[45] Date of Patent: Jun. 2, 1998

[54] EXTERIOR REARVIEW TRUCK MIRROR

[76] Inventor: Michael J. Maccan, 9801 W. Girton Dr., B-216, Lakewood, Colo. 80227

[21] Appl. No.: 542,623

[22] Filed: Oct. 13, 1995

[51] Int. Cl.$^6$ .............................. G02B 7/182; B60R 1/06; B60S 1/04; A47L 1/00
[52] U.S. Cl. .................. 359/509; 359/512; 359/841; 359/872; 359/877
[58] Field of Search ...................... 359/507, 509, 359/512, 604, 605, 841, 844, 864, 865, 872, 873, 874, 876, 877; 15/250.001, 250.003, 250.05, 250.06, 250.43, 256.5

[56] References Cited

U.S. PATENT DOCUMENTS

| | | |
|---|---|---|
| 3,940,822 | 3/1976 | Emerick et al. |
| 4,371,235 | 2/1983 | Locke, Sr. ................ 359/605 |
| 4,466,712 | 8/1984 | Vitaloni ................... 359/507 |
| 4,570,893 | 2/1986 | Ballantyne ............... 359/874 |
| 4,678,294 | 7/1987 | Van Nostrand ........... 359/865 |

FOREIGN PATENT DOCUMENTS

| | | | |
|---|---|---|---|
| 2225023 | 6/1973 | Germany | 359/872 |
| 550082 | 6/1974 | Switzerland | 359/872 |

*Primary Examiner*—Ricky D. Shafer
*Attorney, Agent, or Firm*—Charles Corbin

[57] ABSTRACT

A remotely adjustable rearview truck mirror includes a streamlined housing that is stationarily secured to the exterior of the truck cab, the housing having walls that define an enclosure that has a rearwarly facing rectangular aperture. A generally rectangular mirror support covers the aperture and is pivotally mounted for rotation about a vertical axis through one side of the aperture, and a sealing lid or flange extends generally forward from the periphery of the mirror support so as to lie in close overlapping relationship with the periphery of the aperture, and a sealing element extending along the aperture periphery, slidably engages the flange, and an electrically driven drive mechanism within the enclosure can be controlled from the cab to adjust the orientation of the mirror support. A wiper blade mechanism and a heater are mounted to the mirror support, and spray nozzles on the mirror support are supplied from a reservoir within the enclosure.

5 Claims, 2 Drawing Sheets

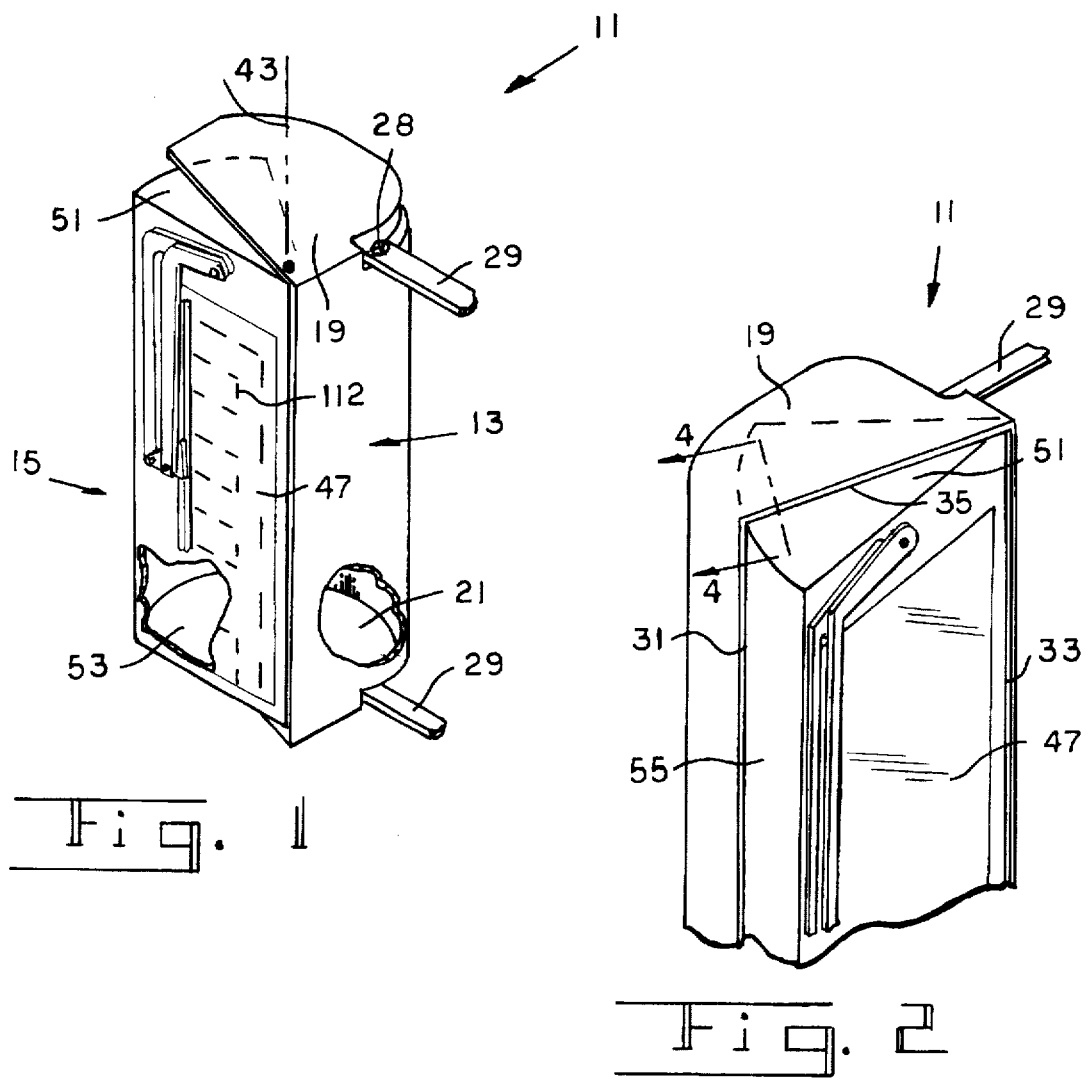
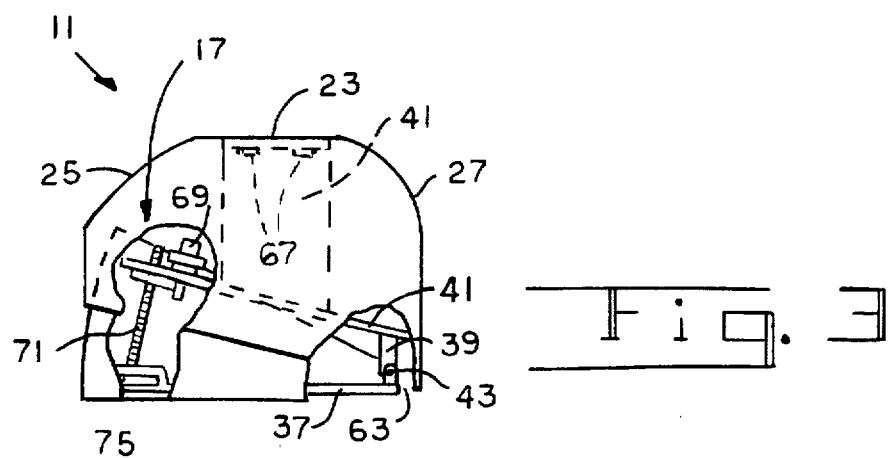

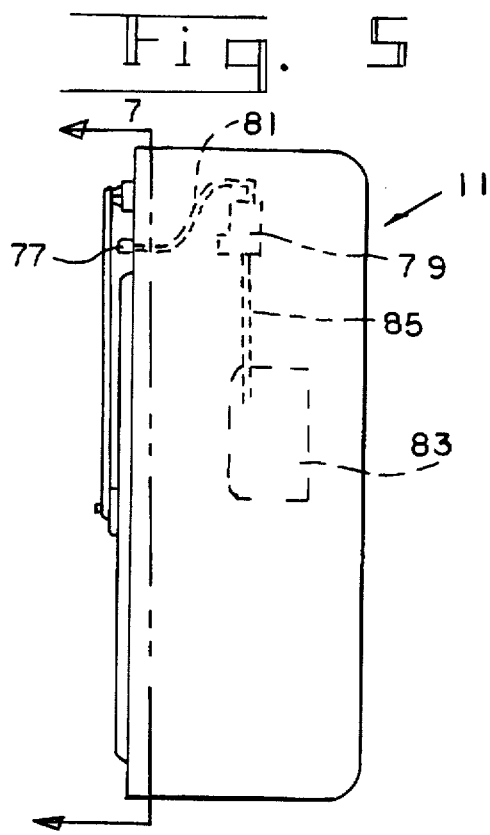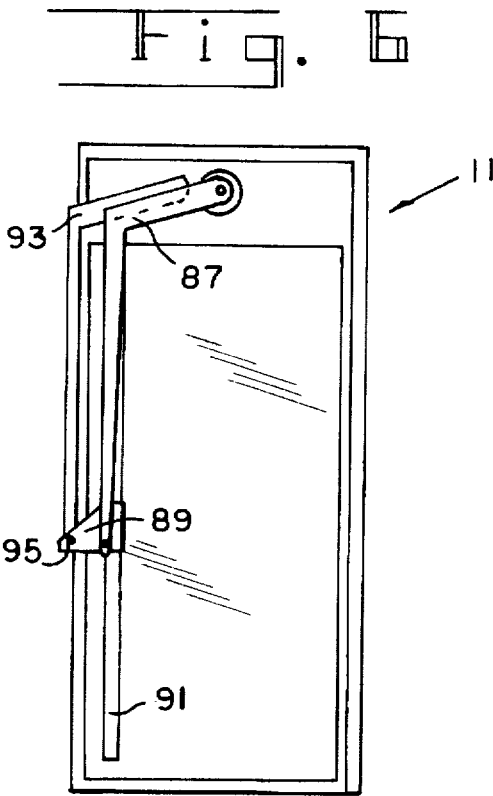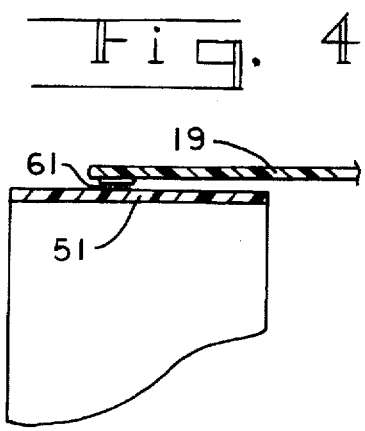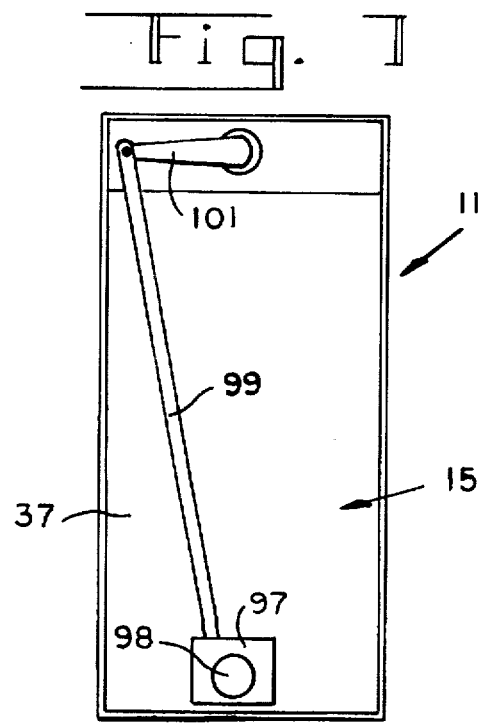

EXTERIOR REARVIEW TRUCK MIRROR

BACKGROUND OF THE INVENTION

1. Field of the Invention

The present invention relates to rearview mirrors of the type generally used on the exterior of the cabins of large trucks, and more particularly to such mirrors that are remotely adjustable by the driver from the cabin of the truck.

2. Description of the Prior Art

For maximum safety it is vital that drivers of large trucks, tandem vehicles and buses have, at all times and under all weather conditions a clear rearward view along both sides of the vehicle. It is also important for situations requiring tight turns, and for dock maneuvering, that there also is a clear view at right angles to the vehicle. Unfortunately, truck mirrors are prone to being obscured by dirt and the effects of inclement weather, particularly in the winter months. Safe driving also requires that adjustments be made to the inclination of the mirror face as required from time to time. The prior art contains a few examples of efforts at addressing these concerns in the form of remotely operated rearview mirrors for trucks.

U.S. Pat. No. 3,940,822 for example, shows a remotely operable truck-type mirror that is equipped with a heating element and a wiper blade. It is noted however, that remote adjustment of the mirror angle was not possible, and direct manual manipulation of the housing and loosening and tightening of threaded fasteners is required in order to adjust the mirror angle. U.S. Pat. No. 4,763,381 shows another rearview truck mirror equipped with a heater and a wiper, yet its orientation cannot be changed without manipulation of a special bolt. An additional shortcoming of such earlier designs is that their housings tend not to be streamlined for efficient performance in an airstream. One attempt at a truck mirror that can be adjusted from the cab is seen in U.S. Pat. No. 4,870,713, but such mirrors require that the entire housing be rotated in order to rotate the mirror face.

The prior art does show some car mirrors that are remotely adjustable. See U.S. Pat. Nos. 3,513,807 and 4,877,319 for example. Unfortunately these car mirror designs do not appear to lend themselves to meeting the demands of an all-weather truck mirror as mentioned above.

SUMMARY OF THE INVENTION

In view of the foregoing limitations of the prior art, it is a general object of the invention to provide an improved remotely operable rearview mirror of the type useful for large trucks, tandem vehicles, and the like.

Another object is to provide an all-weather truck mirror having improved versatility.

Yet another object is to provide such a mirror that has an aerodynamic protective housing that does not have to be rotated in order to vary the angle of the mirror surface.

A further object is to provide such a mirror whereby the mirror face has a wide range of rotation that provides the visual capability required for dock maneuvering and tight turns.

Still another object is to provide a mirror as puth forth above that also has wiper, washer, and heater capability.

Yet another object is to provide a truck mirror with a mirror mount that can be pivotally adjusted relative to a fixed housing, whereby a weather-proof seal is maintained between the movable mirror mount and a housing aperture in which it is mounted, to ensure a weather-proof enclosure for equipment used for driving and operating the mirror mount, wiper blades, spray nozzles and/or beaters used with the invention.

These and other objects and advantages are provided by the present invention in the form of an exterior rearview mirror having a housing adapted for being stationarily attached to the exterior of the vehicle, and the housing including spaced apart top and bottom walls, streamlined forward and side walls, and a rectangular rearwardly facing aperture. The invention also features a mirror support that is pivotally mounted in the aperture for rotation about a vertical axis along one side of the aperture, and for covering the aperture, and the mirror support having a flange or sealing lid that extends forwardly from the mirror support periphery, and held in close overlapping relationship with the periphery of the aperture, and preferrably including sealing means extending along the aperture periphery, and slidably engaging the sealing lid. The flange or sealing lid includes an arcuate wall portion that extends from the side of the mirror support opposite the hinged side of the support.

The invention also includes a remotely controlled electric drive mechanism mounted within the housing and connected to the mirror support for selectively pivoting the mirror support about its axis. In a preferred embodiment there is a wiper blade assembly mounted to the mirror support, along with an electric heater for the mirror, and means for spraying the mirror face with solution from a reservoir within the housing.

BRIEF DESCRIPTION OF THE DRAWINGS

FIG. 1 is a perspective view of a mirror according to the present invention;

FIG. 2 is a partial perspective view of the mirror of FIG. 1;

FIG. 3 is a top view of a mirror according to the invention, with parts broken away for clarity;

FIG. 4 is an enlarged partial sectional view taken along the line 4—4 of FIG. 2; and FIG. 5 is a side elevational view of the mirror of FIG. 1;

FIG. 6 is a view showing the wiper blade assembly mounted to a mirror support; and FIG. 7 is a view showing the drive mechanism for the wiper blade assembly.

DETAILED DESCRIPTION OF THE INVENTION

Referring now to the drawings, FIG. 1 illustrates that the main components of a preferred embodiment of a exterior rearview mirror 11 according to the invention includes a housing 13, and a pivotable support 15 that can be rotated relative to the housing 13 by means of a drive mechanism 17, shown in FIG. 3, mounted within housing 13.

Housing 13, shown in FIG. 2 and 3, is designed to be durable, impact resistant, and moisture proof, and is formed of a suitable plastic material such as that known by the trademark CAPRON, using conventional injection molding techniques. Housing 13 includes top wall 19, bottom 21, front wall 23, and side walls 25 and 27, the wall's combining to give a generally aerodynamic configuration to the housing when it is oriented with front wall 23 facing into the wind stream. Housing 13 is stationarily secured to a pair of conventional support arms 29, using threaded fasteners 28.

The mirror support 15, which supports a rectangular planar mirror element 47, is mounted for pivotal movement within a rectangular housing aperture, best shown in FIG. 2, that is bounded by opposing sides 31 and 33, a top edge 35 and a bottom edge (not shown) opposite top edge 35. The mirror support 15 includes a mounting plate 37 that has one of its vertical sides hingedly attached to hinge brackets 39 on an equipment support bracket 41, shown in FIG. 3, to be described, for rotation of plate 37 about a vertical axis 43, also shown in FIG. 1.

As best shown in FIG. 2, the mirror support 15 features a flange or lid portion that includes a top wall 51, a bottom wall 53, and an arcuate side wall 55. The mirror support 15 is preferrably swingable through a fairly large angle, 45 degrees for example, and it is fitted within the housing aperture such that when mirror support 15 is rotated, the outer surfaces of the lid top and bottom walls, 51 and 53, and curved sidewall 55, will be maintained in, close proximity to inside surfaces of the aperture adjacent the aperture top 35, and bottom, and the side 31, respectively.

In order to enhance the seal between the pivotable mirror support 15 and the periphery of the housing aperture, a strip 61 of a conventional felt-type weather-stripping material is secured along the aperture periphery using a suitable adhesive. FIG. 4 illustrates how such a strip 61 slidably and sealingly engages the lid top wall 51. Preferrably the strip 61 extends completely around the aperture periphery, so as to similarity engage the curved lid portion 55 and the lid bottom 53. Thus the side 63 of the mirror support 15 is also sealed along the side 33 of the aperture.

The equipment support bracket 41 is firmly anchored to the inside of the housing front wall 23 using rivits or other suitable fasteners as shown by reference numerals 67, and to it is secured a reversable screw-type electric drive unit 69 that extends and retracts a threaded drive rod 71 that has its distal end 73 connected at 75 to the movable end of the mirror support plate 37. Thus it will be seen that the drive unit 69 can be activated, as required, to cause the mirror support 15 to be rotated about the axis 43 through a range of about 45 degrees.

It is to be appreciated that a suitable conventional electrical connection via cable (not shown) is provided between the interior of the vehicle cab, and the drive unit 69 and the other electrical components within housing 13, for controlling the delivery of electric power to the various components.

The mirror washing capability of the preferred embodiment of the invention is illustrated in FIG. 5, and includes nozzles 77 attached to the upper exterior of the mirror support 15, and connected to an electric pump 79 by flexible conduit 81. A reservoir 83 holds cleaning liquid supplied to pump 79 via a feed line 85.

FIG. 6 shows that the wiper blade assembly, which is mounted to mirror support 15, includes a wiper arm 87 that has a lower end pivotally connected to a blade bracket 89 which can hold a conventional automobile wiper blade 91. A pivot arm 93 has its upper end pivotally connected to the support 15 for rotation about an axis that is spaced a short distance to the left of the pivot axis of the upper end of arm 87, and the lower end of arm 93 pivotally connects at 95 to the blade bracket 89. It will be appreciated that the net result of this linkage is that the bracket 89, and thus the blade 91, is maintained in a generally vertical orientation as the arm 87 is caused to reciprocate by drive mechanism, to be described, mounted to the other side of the mirror support 15. The blade assembly is designed to start and stop motion of the blade 91 from a blade rest position at the side edge of the mirror 47.

The drive mechanism for the wiper blade assembly is best shown in FIG. 7 wherein a motor bracket 97, secured to the mirror support plate 37, mounts a motor 98 that vertically reciprocates the lower end of a connecting lever 99. This action will cause the arm101, which is connected to the wiper arm 87 (shown in FIG. 6) to reciprocate in the desired manner, to operate the blade 91.

FIG. 1 shows a strip 112 of an electrical heating film of a conventional design known in the automotive industry, that is attached to the back of mirror member 47 using a suitable adhesive. Like the other electrical components within housing 13, the strip 112 is electrically connected to the interior of the vehicle cab, and controlled therefrom.

While a certain preferred embodiment of the invention has been described, it should be understood that the invention is not limited thereto, since there are many variations that will be readily apparent to those skilled in the art, given the benefit of this disclosure. Thus it is intended that the invention be given the broadest possible interpretation within the terms of the claims which follow.

What is claimed is:

1. A remotely adjustable outside rearview mirror for a vehicle, including:

a) weather-proof housing adapted for stationary attachment to the exterior of said vehicle, and having a top wall, bottom wall, forward wall and side walls, and a generally rectangular rearwardly facing aperture that has a periphery including a first vertical edge portion, a second opposite edge portion, a top portion and a bottom portion;

b) a mirror support for supporting a mirror member and for covering said aperture, and pivotally mounted in said aperture for rotation about a vertical axis through said first vertical edge portion, and said support having top and bottom edges, an edge containing said axis, and an opposite edge portion, said support having a sealing lid that extends generally forward from the periphery of said mirror support, whereby said lid is held in close overlapping relationship with the periphery of said aperture throughout rotation of said support, and said lid including a top wall, a bottom wall, and an arcuate wall extending from said support opposite edge portion;

c) remote controlled drive means mounted within said housing, for adjustably pivoting said support about said axis;

d) wherein said arcuate wall lies adjacent the second edge portion of said aperture, and said lid top wall and bottom wall positioned adjacent said top and bottom portions, respectively, of said aperture periphery; and e) sealing means extending along the periphery of said aperture for slidably engaging said lid.

2. A mirror as defined in claim 1 wherein said arcuate wall has a radius of curvature centered on said vertical axis.

3. A mirror as defined in claim 1 including remote-controlled means mounted to said support for wiping the surface of said mirror member.

4. A mirror as defined in claim 3 including remote-controlled means for heating said mirror member.

5. A mirror as defined in claim 4 wherein said mirror member has an exterior surface, and including remote-controlled means for spraying washing liquid on said mirror surface, and a reservoir within said housing for said liquid.

* * * * *